United States Patent
Wellpott

(10) Patent No.: US 6,378,689 B1
(45) Date of Patent: Apr. 30, 2002

(54) VERTICAL CONVEYOR FOR A PALLETIZING APPARATUS

(75) Inventor: Rolf Wellpott, Rahden-Wehde (DE)

(73) Assignee: WST Steuerungstechnik GmbH, Espelkamp (DE)

(*) Notice: Subject to any disclaimer, the term of this patent is extended or adjusted under 35 U.S.C. 154(b) by 0 days.

(21) Appl. No.: 09/671,799

(22) Filed: Sep. 28, 2000

(30) Foreign Application Priority Data

Sep. 28, 1999 (DE) .......................... 199 46 531

(51) Int. Cl.⁷ .................. B65G 17/32; B65G 29/00; B65G 47/24; B65G 47/84; B65G 17/16
(52) U.S. Cl. .................. 198/377.01; 198/475.1; 198/799
(58) Field of Search .................. 198/377.01, 475.1, 198/799

(56) References Cited

U.S. PATENT DOCUMENTS

| | | | |
|---|---|---|---|
| 4,214,848 A | * 7/1980 | Verwey et al. | 198/799 X |
| 4,465,177 A | * 8/1984 | Dorner | 198/799 X |
| 4,987,992 A | * 1/1991 | Pfleger | 198/475.1 X |
| 5,050,726 A | * 9/1991 | Flagg et al. | 198/475.1 X |
| 5,101,963 A | * 4/1992 | Skarlupka et al. | 198/475.1 X |
| 5,732,623 A | 3/1998 | Compera | |

FOREIGN PATENT DOCUMENTS

| | | |
|---|---|---|
| DE | 32 06 083 | 2/1982 |
| DE | 43 03 413 | 2/1993 |
| DE | 195 27 264 | 7/1995 |
| GB | 2093422 | 2/1982 |
| JP | 10-109735 | 4/1998 |

* cited by examiner

Primary Examiner—Christopher P. Ellis
Assistant Examiner—Gene O. Crawford
(74) Attorney, Agent, or Firm—Crowell & Moring LLP

(57) ABSTRACT

A vertical conveyor (1) for a palletizing apparatus for stacking products (2), especially books, periodicals or other such printed products on a pallet, including carriers (7) driven by a drive chain (19) on a closed path and guided horizontally by a guiding means (24), in which the carriers (7) have finger-like supports (9) which move vertically through associated open areas (5, 29) of a delivery conveyor (27) and of a stacking apparatus (3) and there pick up and lay down the products (2). The carriers (7) are constructed as a turning device and have four finger-like supports (9) arranged in a cross shape about an axis of rotation (8), which can be rotated about the axis of rotation (8) in steps of 90° in the horizontal plane, and the open areas (5, 29) of the delivery conveyor, which are associated with the finger-like supports (9) of the carriers (7) and the stacking apparatus, are arranged in a cross shape.

8 Claims, 2 Drawing Sheets

VERTICAL CONVEYOR FOR A PALLETIZING APPARATUS

BACKGROUND OF THE INVENTION

The invention relates to a vertical conveyor for a palletizing apparatus for the stacking of products, especially books, periodicals or similar printed products on a pallet, with carriers driven by a chain in a closed circuit and borne horizontally by a carrying means, wherein the carriers have finger-like supports which in the course of their vertical movement pass through associated open areas of a conveyor and of a stacking apparatus where they pick up and lay down the products.

Vertical conveyors of this kind are disclosed, for example, in published British Patent Application No. GB 2,093,422 (=DE 32 06 083 A1) and published German Patent Application No. DE 43 03 413 A1. The carriers here take the form of forks which in the course of their vertical movement pass through associated open areas of horizontal conveyors preceding and following them, where they pick the products up and lay them down. It is a disadvantage that in order to rotate the products in the area of delivery, i.e., preceding the vertical conveyor on the transport path, a turning apparatus must be disposed which increases the dimensions of the palletizing apparatus. Furthermore, such an arrangement requires an idle cycle in the area of delivery.

U.S. Pat. No. 5,732,623 (=DE 195 27 264 A1) discloses an apparatus for rotating substrates, which is arranged in a rectilinear transport path running in one plane between the printing mechanisms of printing machine.

Japanese Patent Document No. JP 10-109735 also discloses a turning apparatus which is disposed in a transport path lying in one plane.

SUMMARY OF THE INVENTION

It is an object of the invention to provide a vertical conveyor which avoids the aforementioned disadvantages and makes it possible to reduce the dimensions of a palletizing apparatus while still permitting the products to be turned.

These and other objects of the invention have been achieved by providing a vertical conveyor for a palletizing apparatus for stacking products on a pallet, comprising carriers driven in a closed course by a drive chain and guided horizontally by a guide mechanism, wherein the carriers comprise finger-like supports which move vertically through associated open areas of a delivery conveyor and a stacking apparatus and there pick up and deposit the products; wherein the carriers are constructed as a turning apparatus and comprise four finger-like supports which are rotatable in a horizontal plane in steps of 90° about a vertical axis of rotation, and wherein the open areas of the delivery conveyor, and stacking apparatus associated with the finger-like supports are arranged in a cross shape.

Since the carriers are configured as turning apparatus and have four finger-like supports arranged in the form of a cross around an axis of rotation, which are rotatable about the axis of rotation in steps of 90° in the horizontal plane, and the open areas of the feeder conveyor and stacking apparatus associated with the finger-like supports of the carriers are arranged in a cross shape, the invention makes it possible to integrate the turning apparatus into the vertical conveyor such that no additional space is necessary and the turning of the products during the transporting process takes place in the vertical conveyor.

Within the scope of the invention it is envisioned that the feeder conveyor is formed by horizontal conveyors between which a cross-shaped open area is formed through which the carriers can pass.

It is furthermore envisioned that the stacking apparatus of the invention comprises horizontal conveyors between which a cross-shaped open area is formed through which the carriers can pass.

It is also envisioned that the stacking apparatus is vertically adjustably disposed on the vertical conveyor. It is thus possible to stack the products at different levels on the pallet.

Preferably the carriers are disposed on cross-arms fastened at both ends to drive chains. It is advantageous if the axes of rotation of the carriers are constructed as drive shafts journaled in the cross-arms and are in driving connection with electric motors. It can also be advantageous if the motors which turn the carriers are connected by the drive chains to the power mains.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
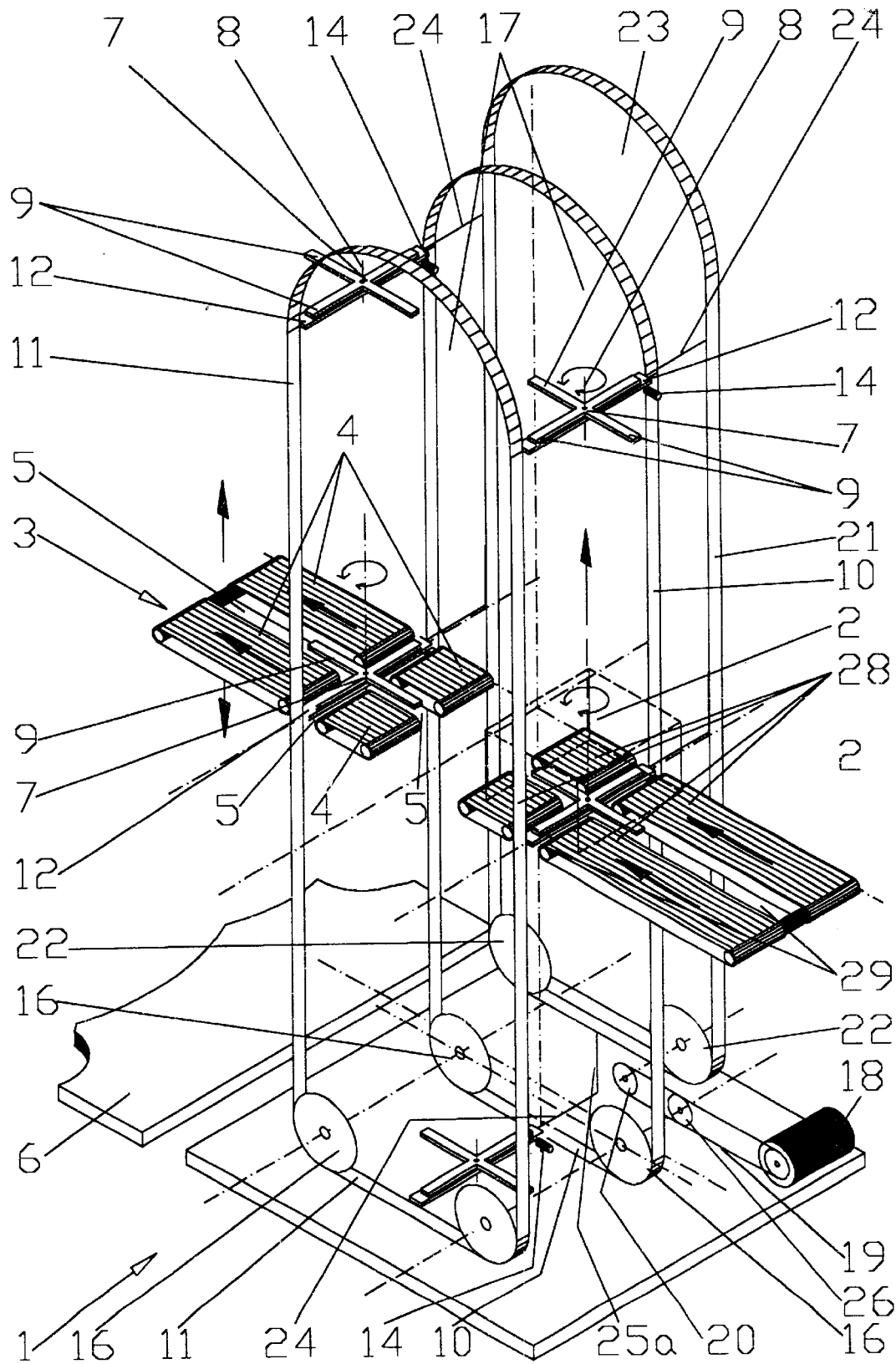
FIG. 1 is a perspective elevation of a vertical conveyor.
Figure 2:
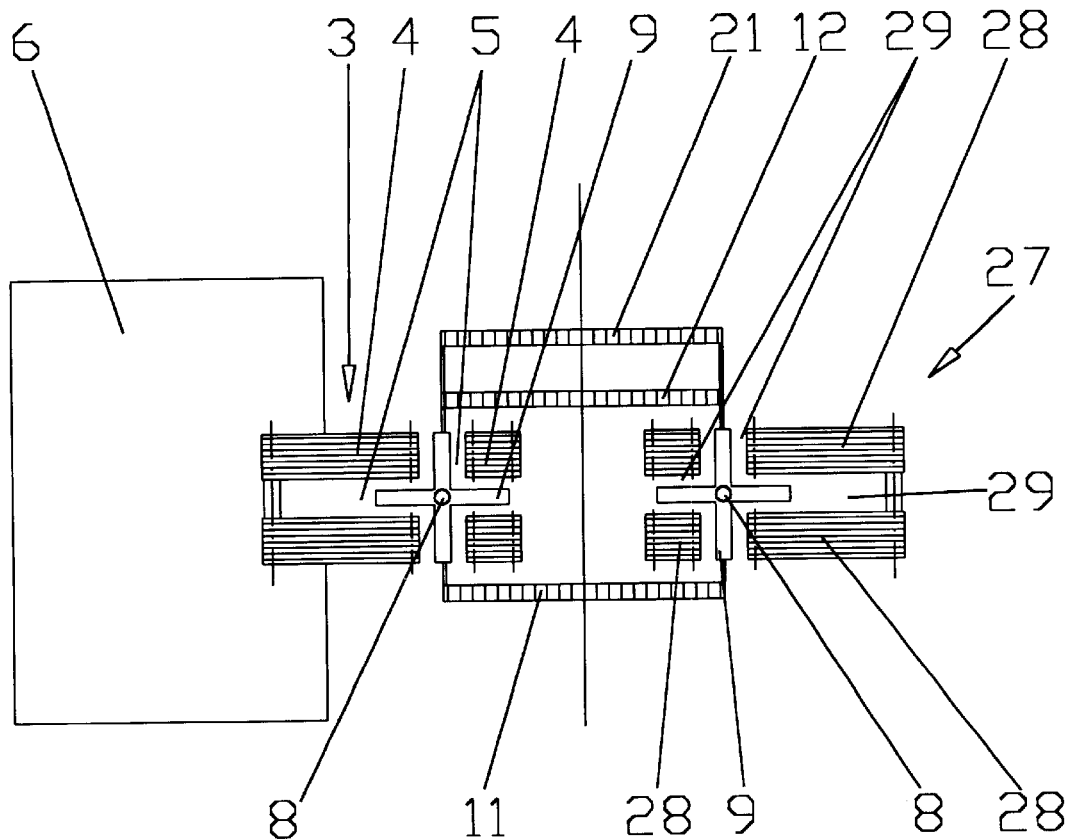
FIG. 2 a top plan view of the carriers of the vertical conveyor of FIG. 1 in the vicinity of the preceding and subsequent horizontal conveyors.
Figure 3:
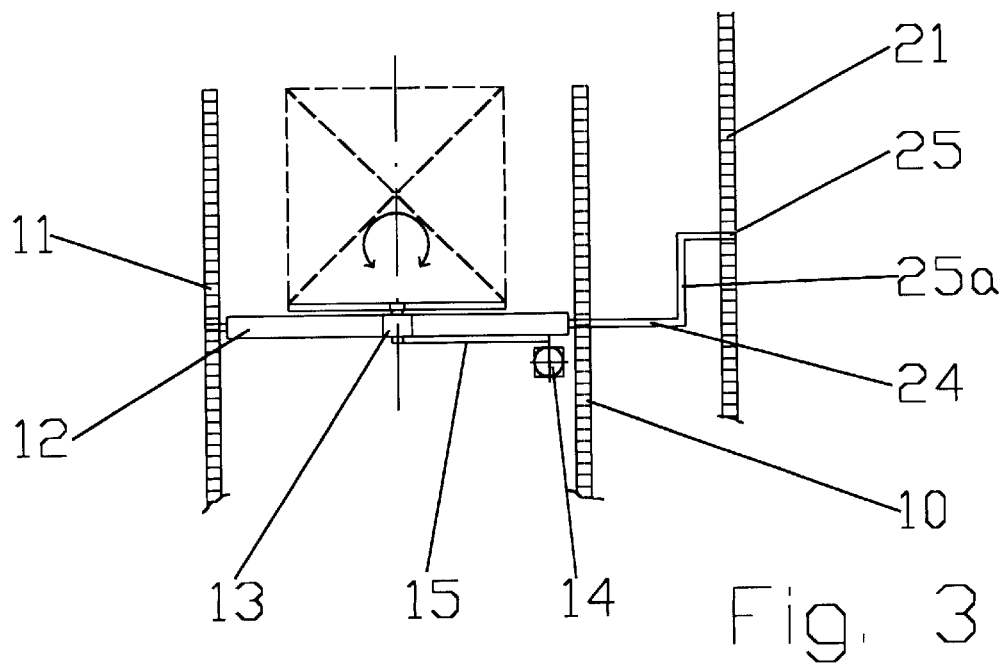
FIG. 3 a side view of a carrier with the drive chains and the guiding chain.

In the drawing, 1 is a vertical conveyor in the form of an endless chain elevator of a palletizing apparatus for the stacking of products 2. The vertical conveyor 1 includes a height-adjustable stacking system 3 with horizontal conveyors 4 between which a cross-shaped open area 5 is formed. The horizontal conveyors 4 are configured as belt or roller conveyors. A palletizer, not shown in the drawing, is arranged behind the stacking apparatus 3 and stacks the products 2 onto a pallet 6.

The vertical conveyor 1 has carriers 7 which have finger-like supports 9 arranged crosswise in fours symmetrically about an axis of rotation 8. The carriers 7 are arranged on cross-arms 12 fastened on both sides to drive chains 10 and 11. The axes of rotation 8 of the carriers 7 are configured as drive shafts journaled in bearings 13 in the cross-arms. Attached to the cross-arms 12 are electric motors 14, which are in driving connection through drive chains 15 with the shafts 8 of the carriers 7. The motors 14 of the carriers 7 are advantageously connected through the chains 10 and 11 to the electric power mains.

The drive chains 10 and 11 of the carriers 7 in the vertical conveyor each pass endlessly around two lower pulleys 16 and upper reversing guides 17 and move along a closed path. The drive chains 10 and 11 are driven in the vicinity of the lower pulleys 16 by an electric motor 18 through a drive chain 19 and a sprocket 20.

The vertical conveyor 1 has a guiding chain 21 for the carriers 7 which is arranged spaced a short distance to the side of the drive chain 10. The guiding chain 21 is guided by lower pulleys 22 and an upper reversing guide 23 in the plane of the drive chains 10 and 11 in the area of the vertical spans of the drive chains. In the horizontal section or the transition to the horizontal, the guiding chain 21 is raised upward, while the upper reversing guide 23 is extended along on a parallel radius corresponding to that of the upper reversing guides 17 of the drive chains 10 and 11. The guiding chain 21 is driven by the electric motor 18 through its drive chain 19 and a sprocket 26.

The cross-arms 12 of the carriers 7 have at one end face crankshaft-shaped members 24 whose shafts 25 extend to the guiding chain 21 and are pivotably mounted thereon. The length of the crank arm 25*a* is equal to the maximum horizontal distance between the guiding chain 21 and the drive chains 10 and 11. With this arrangement the carriers can be held in an always horizontal orientation throughout their entire circulatory travel. The upper reversing guides 17 and 23 which extend in a radius thereby assure that the carriers 7 turn continuously as they circulate, so that undesirable accelerations of the deposited products, which might cause the products to slip off the carriers, are reliably prevented.

The delivery of the products 2 is performed by a delivery conveyor 27 arranged on the vertical conveyor 1. The delivery conveyor 27 is formed by horizontal conveyors 28 between which a cross-shaped open area 29 is formed. The horizontal conveyors 28 are formed by conveyor belts or rollers.

The cross-shaped open areas 5 and 29 of the stacking apparatus 3 and of the delivery conveyor 27 are coordinated with the finger-like supports 9 of the circulating carriers 7 such that the carriers can always pass freely through the cross-shaped openings when the products 2 are lifted from the delivery conveyor 27 or are deposited on the stacking apparatus 3. During the transport in the upper part of the vertical conveyor 1, the carriers 7 rotate about their axes of rotation 8 in a horizontal plane in steps of 90° by means of the electric motors 14. This rotation in 90-degree steps assures that the open areas 5 of the stacking apparatus 3 and the open areas 29 of the delivery conveyor 27 can be cleared each time. On the other hand, the rotation in 90-degree steps fully satisfies the requirements of stacking the products on the pallet 6.

The arrangement according to the invention of a turning apparatus, i.e, rotatable carriers 7 on the vertical conveyor 1, achieves the advantage that the dimensions of a palletizing apparatus can be reduced in an advantageous manner. Furthermore, by arranging a turning apparatus in the delivery area, idle cycles are avoided.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A vertical conveyor for a palletizing apparatus for stacking products on a pallet, comprising carriers driven in a closed course by a drive chain and guided horizontally by a guide mechanism, wherein the carriers comprise finger-like supports which move vertically through associated open areas of a delivery conveyor and a stacking apparatus and there pick up and deposit the products; wherein the carriers are constructed as a turning apparatus and comprise four finger-like supports which are rotatable in a horizontal plane in steps of 90° about the axis of rotation, and wherein the open areas of the delivery conveyor and stacking apparatus associated with the finger-like supports are arranged in a cross shape.

2. A vertical conveyor according to claim 1, wherein the delivery conveyor comprises a plurality of horizontal conveyors between which a cross-shaped open area is formed.

3. A vertical conveyor according to claim 1, wherein the stacking apparatus comprises a plurality of horizontal conveyors between which a cross-shaped open area is formed.

4. A vertical conveyor according to claim 1, wherein the stacking apparatus is arranged so as to be vertically displaceable on the vertical conveyor.

5. A vertical conveyor according to claim 1, wherein said carriers are arranged on cross-arms fastened at both ends to drive chains.

6. A vertical conveyor according to claim 1, wherein the carriers have axes of rotation defined by drive shafts journaled in cross-arms.

7. A vertical conveyor according to claim 6, wherein the drive shafts are operatively connected to electric motors for driving the carriers about the respective axes of rotation.

8. A vertical conveyor according to claim 7, wherein said motors are connected to electric power mains through (the) drive chains.

* * * * *